United States Patent
Matsuda

(10) Patent No.: US 12,140,205 B2
(45) Date of Patent: Nov. 12, 2024

(54) DRIVE DEVICE, IMAGE FORMING APPARATUS, ROTARY BODY SUPPORT DEVICE, AND ROTARY BODY

(71) Applicant: Naoki Matsuda, Kanagawa (JP)

(72) Inventor: Naoki Matsuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 701 days.

(21) Appl. No.: 16/910,234

(22) Filed: Jun. 24, 2020

(65) Prior Publication Data

US 2021/0033171 A1 Feb. 4, 2021

(30) Foreign Application Priority Data

Jul. 30, 2019 (JP) .................................. 2019-139966

(51) Int. Cl.
*F16H 1/20* (2006.01)
*F16H 55/17* (2006.01)
*F16H 57/021* (2012.01)
*G03G 15/00* (2006.01)

(52) U.S. Cl.
CPC .............. *F16H 1/20* (2013.01); *F16H 55/17* (2013.01); *F16H 57/021* (2013.01); *G03G 15/757* (2013.01)

(58) Field of Classification Search
CPC ... F16H 1/20; F16H 1/08; F16H 55/17; F16H 57/0031; F16H 57/021; F16H 2055/065; G03G 21/1647; G03G 15/757; G03G 2215/00679; G03G 2221/1657
See application file for complete search history.

(56) References Cited

U.S. PATENT DOCUMENTS

| 3,142,195 | A | * | 7/1964 | Henyon | F16D 25/0638 |
| | | | | | 192/48.8 |
| 5,845,175 | A | * | 12/1998 | Kumar | F16D 1/0858 |
| | | | | | 403/375 |
| 5,937,241 | A | * | 8/1999 | Kumar | G03G 15/757 |
| | | | | | 399/167 |
| 9,335,708 | B1 | * | 5/2016 | Makita | G03G 21/1857 |
| 9,541,884 | B1 | * | 1/2017 | Kawai | G03G 21/1647 |

(Continued)

FOREIGN PATENT DOCUMENTS

| JP | 10-226439 | 8/1998 |
| JP | 2000-321836 | 11/2000 |

(Continued)

OTHER PUBLICATIONS

Office Action dated Mar. 3, 2023 issued in corresponding Japanese Patent Application No. 2019-139966.

*Primary Examiner* — Zakaria Elahmadi
(74) *Attorney, Agent, or Firm* — Harness, Dickey & Pierce, P.L.C.

(57) ABSTRACT

A drive device includes a bracket, a fixed shaft, and a drive transmitter. The fixed shaft is fixed to the bracket and has a groove. The drive transmitter is rotatably mounted on the fixed shaft. The drive transmitter includes an opening through which the fixed shaft is inserted, and a projection disposed on an inner circumference of the opening and configured to fit into the groove of the fixed shaft. The drive transmitter is configured to hold the fixed shaft over a range including both ends of the opening in a thrust direction of the drive transmitter with the drive transmitter being attached to the fixed shaft.

14 Claims, 13 Drawing Sheets

(56) References Cited

U.S. PATENT DOCUMENTS

| | | | |
|---|---|---|---|
| 9,581,953 B2* | 2/2017 | Suido | F16H 57/0025 |
| 2003/0059233 A1* | 3/2003 | Jang | F16D 1/101 |
| | | | 399/167 |
| 2004/0103733 A1* | 6/2004 | Sumita | H02K 11/21 |
| | | | 74/421 A |
| 2005/0019063 A1* | 1/2005 | Amanai | G03G 15/757 |
| | | | 399/167 |
| 2011/0182623 A1* | 7/2011 | Tomatsu | G03G 15/757 |
| | | | 399/167 |
| 2011/0229199 A1* | 9/2011 | Ikebata | G03G 15/757 |
| | | | 399/117 |
| 2012/0060633 A1* | 3/2012 | Ishida | B41J 23/025 |
| | | | 74/413 |
| 2016/0054698 A1* | 2/2016 | Sato | G03G 21/1857 |
| | | | 399/167 |
| 2016/0062299 A1* | 3/2016 | Hirose | G03G 15/1615 |
| | | | 399/167 |
| 2016/0170361 A1 | 6/2016 | Matsuda et al. | |
| 2016/0221772 A1 | 8/2016 | Ishida et al. | |
| 2018/0283459 A1* | 10/2018 | Carter | F16D 3/04 |
| 2019/0079446 A1* | 3/2019 | Zensai | G03G 15/5008 |
| 2019/0227477 A1* | 7/2019 | Hanamoto | G03G 21/16 |
| 2020/0125006 A1 | 4/2020 | Matsuda et al. | |
| 2020/0125022 A1 | 4/2020 | Matsuda | |
| 2021/0054919 A1* | 2/2021 | Carson | F16H 57/0409 |
| 2022/0090669 A1* | 3/2022 | Taki | F16H 55/17 |

FOREIGN PATENT DOCUMENTS

| | | |
|---|---|---|
| JP | 2001-075346 A | 3/2001 |
| JP | 2005-273722 A | 10/2005 |
| JP | 2006-030334 A | 2/2006 |
| JP | 2006-112467 A | 4/2006 |
| JP | 2011-137478 A | 7/2011 |
| JP | 2011-214535 A | 10/2011 |
| JP | 2014-052618 A | 3/2014 |
| JP | 2017-058479 A | 3/2017 |
| JP | 2017-219808 A | 12/2017 |

\* cited by examiner

DRIVE DEVICE, IMAGE FORMING APPARATUS, ROTARY BODY SUPPORT DEVICE, AND ROTARY BODY

CROSS-REFERENCE TO RELATED APPLICATION

This patent application is based on and claims priority pursuant to 35 U.S.C. § 119(a) to Japanese Patent Application No. 2019-139966, filed on Jul. 30, 2019, in the Japan Patent Office, the entire disclosure of which is hereby incorporated by reference herein.

BACKGROUND

Technical Field

This disclosure relates to a drive device, an image forming apparatus, a rotary body support device, and a rotary body.

Discussion of the Background Art

Various types of drive devices are known to include a bracket, a fixed shaft fixed to the bracket, and a drive transmitter rotatably attached to the fixed shaft.

SUMMARY

At least one aspect of this disclosure provides a drive device including a bracket, a fixed shaft, and a drive transmitter. The fixed shaft is fixed to the bracket and has a groove. The drive transmitter is rotatably mounted on the fixed shaft. The drive transmitter includes an opening through which the fixed shaft is inserted, and a projection disposed on an inner circumference of the opening and configured to fit into the groove of the fixed shaft. The drive transmitter is configured to hold the fixed shaft over a range including both ends of the opening in a thrust direction of the drive transmitter with the drive transmitter being attached to the fixed shaft.

Further, at least one aspect of this disclosure provides an image forming apparatus including the above-described drive device.

Further, at least one aspect of this disclosure provides a rotary body support device including a fixed shaft, a rotary body, a groove, and a projection. The rotary body is rotatably mounted on the fixed shaft and having an opening through which the fixed shaft is inserted in an axial direction of the rotary body. The groove is provided in one of an inner circumference of the opening of the rotary body and an outer circumference of the fixed shaft. The projection is disposed on another one of the inner circumference of the opening of the rotary body and the outer circumference of the fixed shaft. The projection is configured to be fitted in the groove. A plurality of shaft receiving areas is provided on both sides across the projection in the axial direction, where straight portions of the fixed shaft contact straight portions of the inner circumference of the opening of the rotary body.

Further, at least one aspect of this disclosure provides a rotary body including an opening and a projection. A fixed shaft is inserted through the opening in an axial direction of the rotary body. The projection is disposed on an inner circumference of the opening and configured to fit into a groove of the fixed shaft. A plurality of shaft receiving areas is provided on both sides across the projection in the axial direction of the rotary body and configured to contact straight portions of the fixed shaft across the groove of the fixed shaft.

BRIEF DESCRIPTION OF THE SEVERAL VIEWS OF THE DRAWINGS

An exemplary embodiment of this disclosure will be described in detail based on the following figured, wherein.

Figure 1:
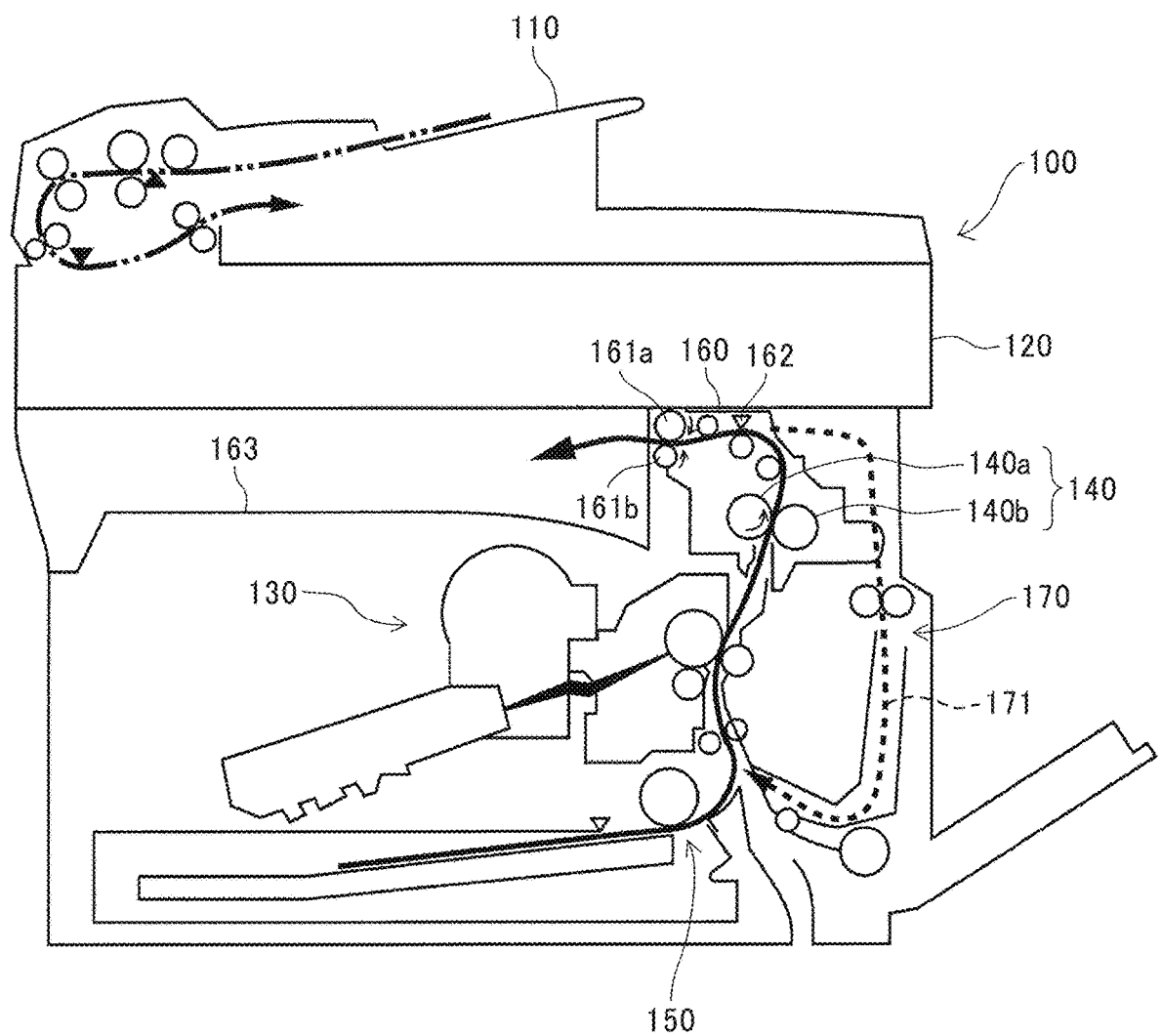
FIG. 1 is a diagram illustrating a schematic configuration of an image forming apparatus according to an embodiment of this disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

In the following description, the term "image forming apparatus" refers to an image forming apparatus that performs image formation by attaching developer or ink to a medium such as paper, OFFP sheet, yarn, fiber, cloth, leather, metal, plastic, glass, wood, ceramics and the like. Further, it is to be noted that the term "image formation" indicates an action for providing (i.e., printing) not only an image having meanings such as texts and figures on a recording medium but also an image having no meaning such as patterns on a recording medium. Further, it is to be noted that the term "sheet" is not limited to indicate a paper sheet but also includes OHP transparency sheet, cloth, and a material which is called as a recording target medium, a recording medium, a recording sheet, or a recording paper, and is used to which the developer or ink is attracted. In the above-described embodiment, a sheet material is described as the "sheet", and the dimensions, the materials, the shapes, the relative arrangements, and the like described for the respective component are examples, and the scope of the present disclosure is not intended to be limited thereto unless otherwise particularly specified. Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

A description is given of embodiments where this disclosure is applied to a drive device of an electrophotographic image forming apparatus, for example, a copier in the following embodiments. Further, the image forming apparatus 100 is not limited to an electrophotographic image forming apparatus but may be a non-electrophotographic image forming apparatus such as an inkjet type image forming apparatus.

FIG. 1 is a diagram illustrating a schematic configuration of an image forming apparatus 100 (as a copier in the present embodiment of this disclosure) according to an embodiment of this disclosure.

As illustrated in FIG. 1, the image forming apparatus 100 includes an automatic document feeder 110, an image reading device 120, an image forming device 130, a fixing device 140, a sheet feeding device 150, a sheet ejecting device 160, and a sheet reentry device 170. These devices form an image forming part.

In this embodiment, the automatic document feeder 110 includes an original document feeding mechanism that performs a sheet-through image reading operation.

The image reading device 120 employs a known image reading device to read image data of an original document while the original document is being conveyed to the image reading position by the automatic document feeder 110.

The image forming device 130 in the present embodiment employs a known device including a photoconductor, a charger, an optical writing unit, a developing unit, a transfer unit, a cleaning unit, and a charge eliminating unit. In other words, in the image forming device 130, the charger uniformly charges the surface of the photoconductor with electric potential, the optical writing unit forms a latent image on the charged surface of the photoconductor, the developing unit develops the latent image to a visible toner image, and the transfer unit transfers the toner image onto a sheet (recording sheet). The cleaning unit cleans the surface of the photoconductor by removing residual toner remaining on the surface of the photoconductor. The charge eliminating unit eliminates residual electric potential, that is, resets the value of residual electric potential to zero (0).

The fixing device 140 is provided with a pair of fixing rollers including a heat roller 140a and a pressure roller 140b.

The sheet feeding device 150 feeds a sheet one by one from a sheet bundle loaded on a sheet tray that functions as a sheet loader and conveys the sheet toward the transfer unit of the image forming device 130.

The sheet ejecting device 160 either ejects the sheet traveling from the fixing device 140 to a sheet ejection tray 163 or changes the direction of conveyance of the sheet (switches back the sheet) toward the sheet reentry device 170. Specifically, the sheet ejecting device 160 includes sheet ejection rollers 161a and 161b in pair and a sheet ejection sensor 162.

When the sheet ejection sensor 162 detects that the end of the sheet P is nipped or held between the sheet ejection rollers 161a and 161b, the sheet ejection rollers 161a and 161b are reversely rotated to convey the sheet to the sheet reentry device 170.

In the sheet reentry device 170, the sheet having an image formed on one side by the image forming device 130 and being held by the sheet ejection rollers 161a and 161b of the sheet ejecting device 160 passes a switchback passage 171, as indicated by a broken line in FIG. 1, so that the opposite side of the sheet is to face the surface of the photoconductor when another image is transferred onto the sheet. In this state, the sheet passes the switchback passage 171 in the sheet reentry device 170 to be supplied to the image forming device 130. Note that the sheet ejection rollers 161a and 161b in pair are capable of rotating in a forward direction and a reverse direction in response to input by rotations of external gears meshing with each other.

Figure 2A:
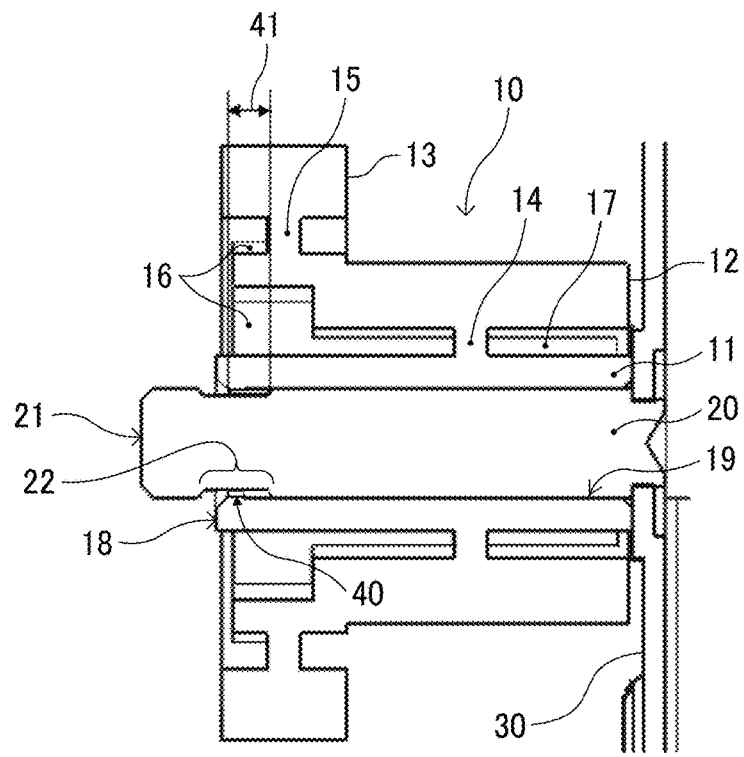
FIGS. 2A and 2B are explanatory views of a structure for mounting a snap-fit-type two-step gear on a fixed shaft.
Figure 2B:
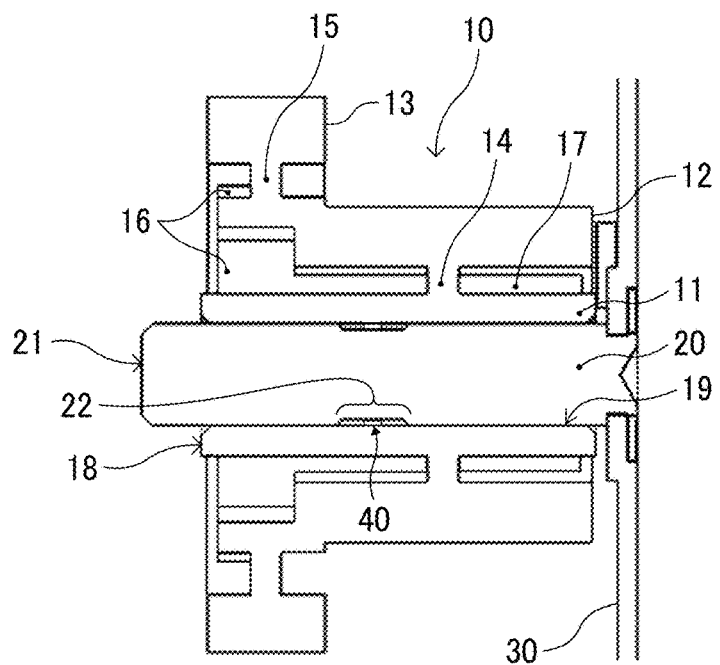

FIGS. 2A and 2B are explanatory views of a structure for mounting a two-step gear 10 that is made of resin and functions as a rotary body or a drive transmitter on a fixed shaft 20. To be more specific, FIG. 2A illustrates a known configuration of a gear and a shaft and FIG. 2B illustrates a configuration of a gear and a shaft according to the present embodiment of this disclosure.

The two-step gear 10 includes a boss 11, a small diameter rim 12, and a large diameter rim 13, which are concentric with each other. An inner web 14 is provided between the boss 11 and the inner circumference of the small diameter rim 12, and an outer web 15 is provided between the outer circumference on the tip end side (in other words, the distal end side) of the small diameter rim 12 and the inner circumference of the large diameter rim 13. A plurality of ribs 16 and 17 are radially disposed. To be more specific, the inner web 14, the outer web 15, and the plurality of ribs 16 and 17 are disposed outwardly from the projection in the radial direction of the two-step gear 10. The fixed shaft 20 is fixed to the bracket 30 by caulking and is not rotatable. A plurality of tooth portions are integrally formed on the outer circumference of the small diameter rim 12. Similarly, a plurality of tooth portions are integrally formed on the outer circumference of the large diameter rim 13. A fixed shaft insertion hole 19 is defined by the boss 11. The fixed shaft 20 is inserted into the fixed shaft insertion hole 19, so that the two-step gear 10 is rotatably fit to the fixed shaft 20.

As illustrated in FIG. 2A, in the known configuration, the fixed shaft 20 has a tip end 21 and a groove 22 having a small diameter near the tip end 21. The boss 11 has a tip end 18 whose position in a thrust direction (also referred to as an axial direction) of the two-step gear 10 is in the groove 22. A snap fit portion 40 that functions as a projection is provided at a portion facing the groove 22, on the inner circumferential surface of the fixed shaft insertion hole 19 of the boss 11. That is, the snap fit portion 40 is provided at the tip end of the two-step gear 10 on the tip end side of the fixed shaft 20. Since the snap fit portion 40 may be used to position the two-step gear 10 with respect to the fixed shaft 20 with a certain amount of strength in the thrust direction, the assemblability of the configuration may be enhanced.

However, in the configuration of the known drive device, a tip end side area 41 near the tip end 18 of the boss 11 is provided facing the groove 22, where the two-step gear 10 does not hold the fixed shaft 20. Since the fixed shaft 20 is not held in the tip end side area 41, a shaft receiving area in which the fixed shaft 20 is held by the two-step gear 10 in the configuration of the known drive device is reduced (shortened) by the tip end side area 41. Since the two-step gear 10 is rotatably mounted on the fixed shaft 20, a play is provided for the two-step gear 10. As the length of the area that holds the fixed shaft 20 is reduced, the two-step gear 10 tends to tilt relative to the fixed shaft 20 easily. Therefore, the accuracy in gear meshing deteriorates, which causes an increase in vibration and noise.

As an example, a known drive device further includes the fixed shaft having a groove and the drive transmitter having an opening through which the fixed shaft is inserted and a projection to fit in the groove. The projection is disposed at an end portion on the inner circumference of the opening. In the known drive device, the drive transmitter is likely to tilt.

In order to address this inconvenience, as illustrated in FIG. 2B, the two-step gear 10 according to the present embodiment has a configuration in which the snap fit portion 40 is provided avoiding the end portion of the boss 11 in the thrust direction (i.e., the axial direction) of the two-step gear 10 and the groove 22 is provided on the fixed shaft 20 so as to face the snap fit portion 40 of the two-step gear 10. Due to this configuration, the two-step gear 10 reliably holds the fixed shaft 20 up to both ends in the thrust direction of the boss 11.

In other words, shaft receiving areas are provided on both sides of the two-step gear 10 across the snap fit portion 40 in the axial direction of the two-step gear 10, where straight portions of the fixed shaft 20 contact straight portions of the inner circumference of the fixed shaft insertion hole 19 of the two-step gear 10. Accordingly, this configuration prevents the two-step gear 10 from tilting relative to the fixed shaft 20 and enhances the assemblability.

Figure 3:
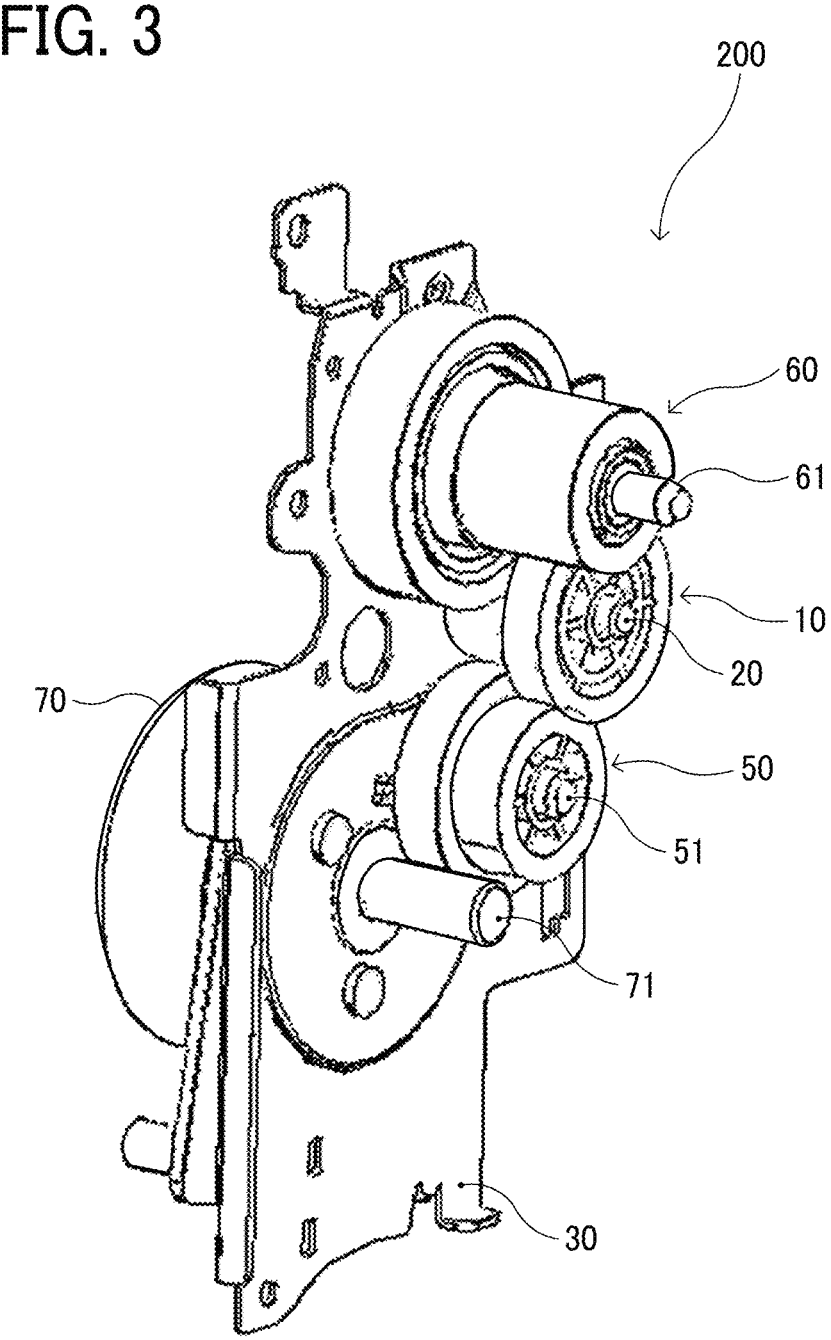
FIG. 3 is a perspective view illustrating a drive device.
Figure 4:
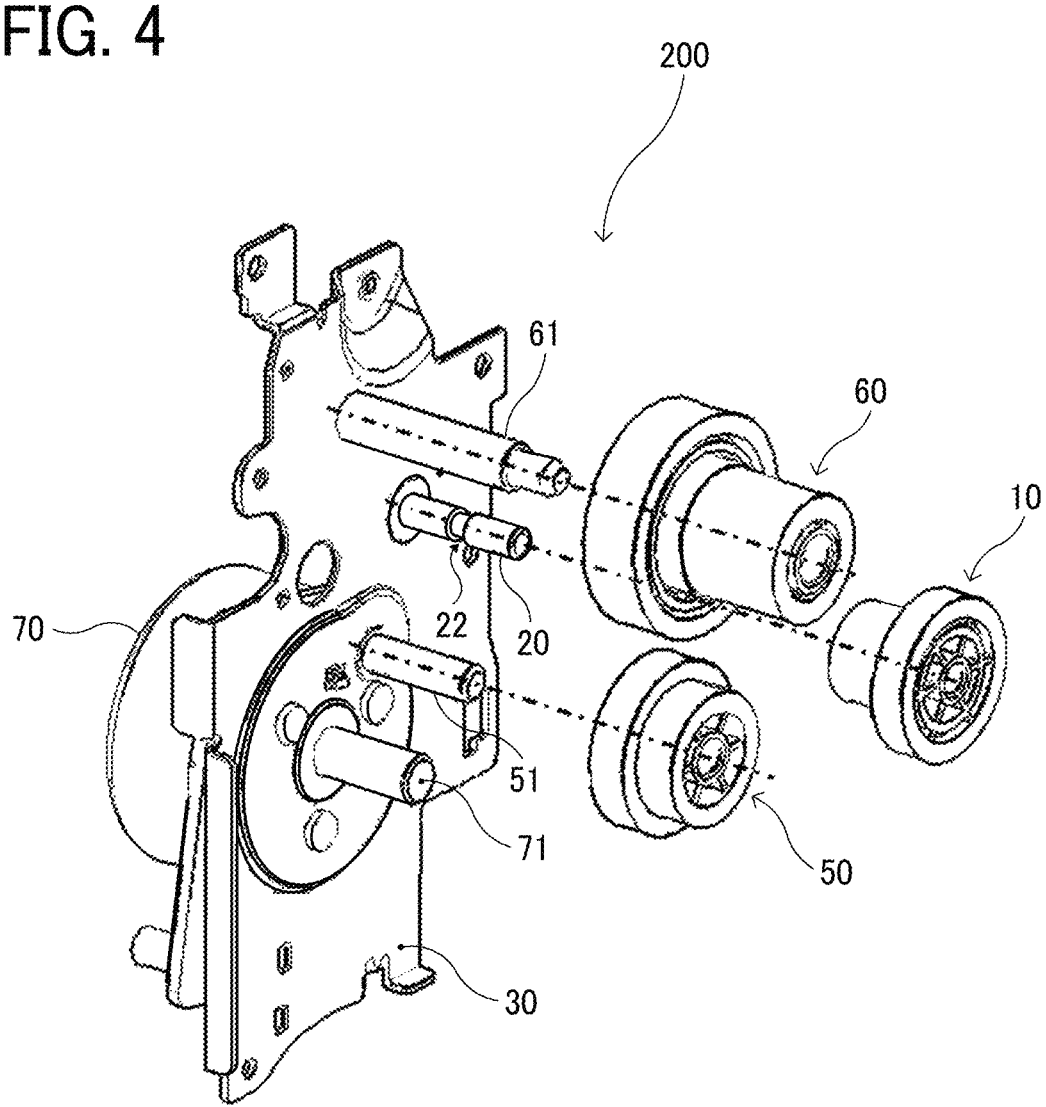
FIG. 4 is an exploded perspective view illustrating the drive device.
Figure 5:
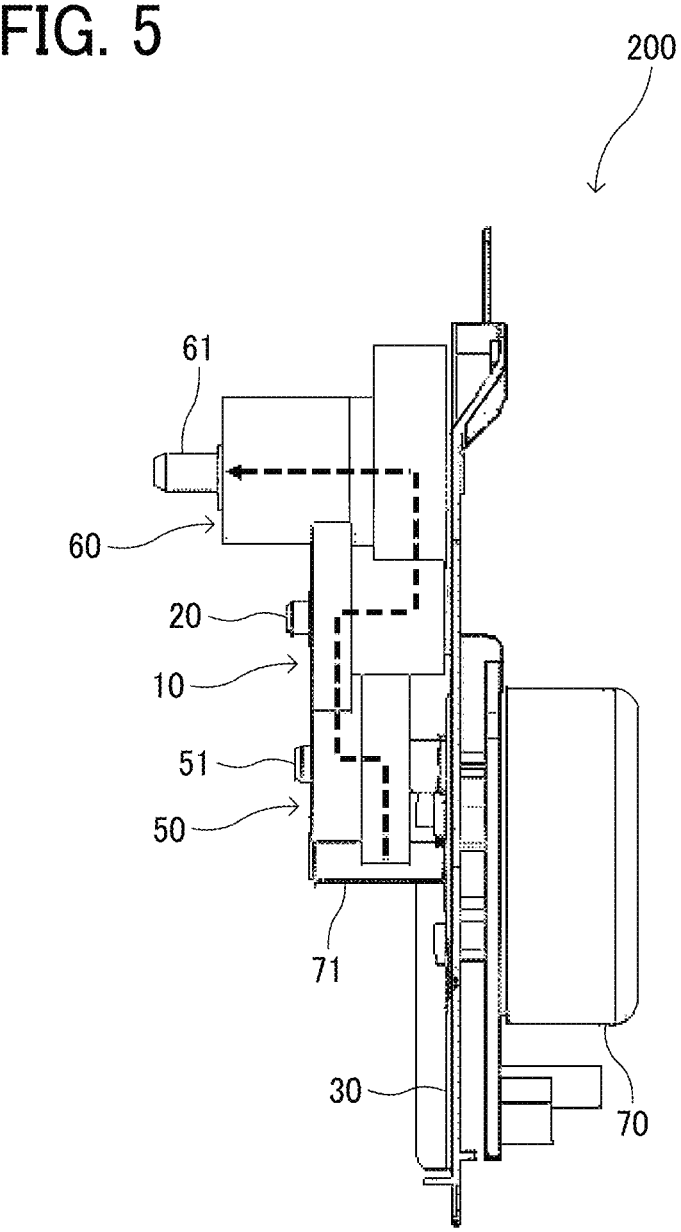
FIG. 5 is a side view illustrating the drive device.

FIG. 3 is a perspective view illustrating a drive device 200, which is an example using the two-step gear 10 according to the present embodiment illustrated in FIG. 2B. FIG. 4 is an exploded perspective view illustrating the drive device 200. FIG. 5 is a side view illustrating the drive device 200.

In FIG. 3, the drive device 200 includes a drive source side two-step gear 50 and an output side two-step gear 60 attached to the bracket 30. As illustrated in FIG. 2B, the drive source side two-step gear 50 and the output side two-step gear 60 are meshed with the two-step gear 10. Hereinafter, in the drive device 200, the two-step gear 10 illustrated in FIG. 2B is referred to as a snap-fit-type two-step gear 10 according to the present embodiment of this disclosure. The snap-fit-type two-step gear 10, the drive source side two-step gear 50, and the output side two-step gear 60 are fixed by caulking to the fixed shaft 20, a fixed shaft 51, and a fixed shaft 61, respectively. A motor 70 that functions as a drive source is attached on one side face of the bracket 30, which is opposite to an opposite side face to which the snap-fit-type two-step gear 10, the drive source side two-step gear 50, and the output side two-step gear 60 are attached. The motor 70 includes a motor gear 71 that functions as a motor output shaft around which gear teeth are integrally formed. The motor gear 71 protrudes from the opposite side face of the bracket 30, on which the snap-fit-type two-step gear 10, the drive source side two-step gear 50, and the output side two-step gear 60 are attached.

The gear teeth of the motor gear 71 are meshed with the gear teeth on the outer circumference of the large diameter rim of the drive source side two-step gear 50. Similarly, the gear teeth on the outer circumference of the small diameter rim of the drive source side two-step gear 50 are meshed with the gear teeth on the outer circumference of the large diameter rim of the snap-fit-type two-step gear 10. The gear teeth on the outer circumference of the small diameter rim of the snap-fit-type two-step gear 10 are meshed with the gear teeth on the small diameter rim of the output side two-step gear 60. Then, the gear teeth on the outer circumference of the large diameter rim of the output side two-step gear 60 are meshed with the gear teeth of a gear of a drive target, for example, the gear teeth of a drive gear provided in the fixing device 140 illustrated in FIG. 1. With the above-described relation of gear meshing, the driving force from the motor 70 is transmitted to the motor gear 71, the drive source side two-step gear 50, the snap-fit-type two-step gear 10, and the output side two-step gear 60 in this order.

In FIG. 4, the snap-fit-type two-step gear 10, the drive source side two-step gear 50, and the output side two-step gear 60 are assembled as follows. First, the drive source side two-step gear 50 is attached to the fixed shaft 51 and the output side two-step gear 60 is attached to the fixed shaft 61. Then, the snap-fit-type two-step gear 10 is attached to the fixed shaft 20. As illustrated in FIG. 3, the large diameter rim of the snap-fit-type two-step gear 10 is overlapped with the large diameter rim of the drive source side two-step gear 50 and with the large diameter rim of the output side two-step gear 60. In other words, the projection range of the large diameter rim of the snap-fit-type two-step gear 10 is partially overlapped with the projection range of the large diameter rim of the drive source side two-step gear 50 and with the large diameter rim of the output side two-step gear 60, within a projection plane by the normal incident light to the surface of the bracket 30. Further, the large diameter rim of the snap-fit-type two-step gear 10 is disposed on the upstream side in the attaching direction in which the snap-fit-type two-step gear 10 is attached to the fixed shaft 20. With this configuration, the snap-fit-type two-step gear 10 is prevented from coming off from the fixed shaft 20 by the groove 22 of the fixed shaft 20 and the snap fit portion 40 of the snap-fit-type two-step gear 10. That is, the drive source side two-step gear 50 and the output side two-step gear 60 are prevented from coming off from the fixed shaft 51 and the fixed shaft 61, respectively, by the snap-fit-type two-step gear 10. The large diameter rim of the drive source side two-step gear 50 and the large diameter rim of the output side two-step gear 60 correspond to a bracket side portion and the large diameter rim of the snap-fit-type two-step gear 10 corresponds to an opposite side portion to face the opposite side of the bracket side portion to a bracket facing side of the bracket side portion.

In FIG. 5, the driving force is transmitted from the motor 70 as indicated by a broken line. As can be seen from this figure, the large diameter rim of the snap-fit-type two-step gear 10 is overlapped with the large diameter rim of the drive source side two-step gear 50 and the large diameter rim of the output side two-step gear 60. Accordingly, the snap-fit-type two-step gear 10 is prevented from coming off from the fixed shaft 20, and with this configuration, the drive source side two-step gear 50 and the output side two-step gear 60 are simultaneously prevented from coming off from the fixed shaft 51 and the fixed shaft 61, respectively.

Figure 6A:
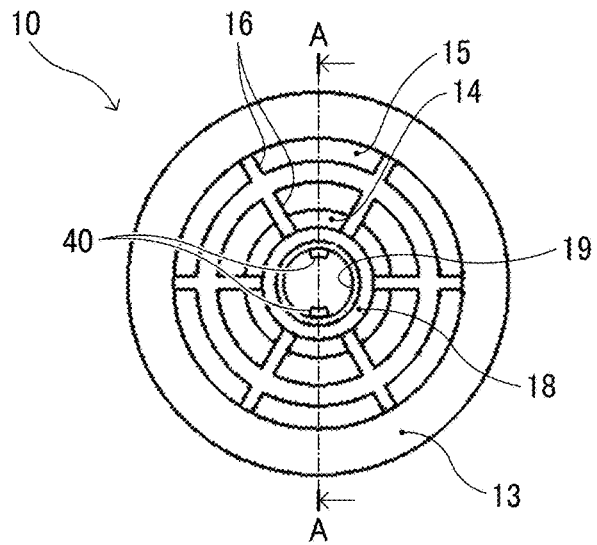
FIGS. 6A, 6B, and 6C are diagrams for explaining preferred examples of a snap-fit-type two-step gear.
Figure 6B:
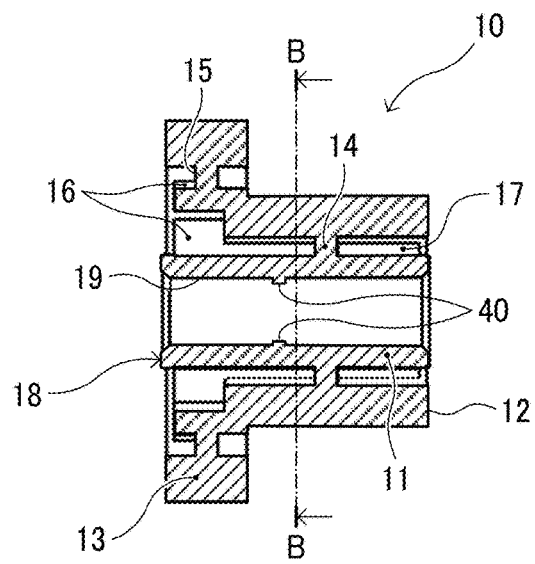
Figure 6C:
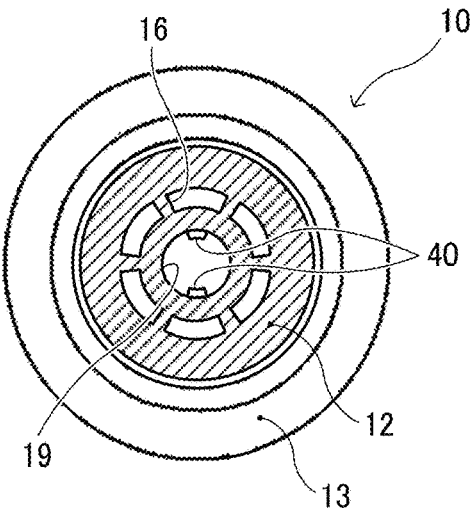

FIGS. 6A, 6B, and 6C are diagrams for explaining preferred examples of the positions of the snap fit portions 40 on the snap-fit-type two-step gear 10. To be more specific, FIG. 6A is a left side view illustrating the snap-fit-type two-step gear 10, FIG. 6B is a cross sectional view illustrating the snap-fit-type two-step gear 10, taken by a line A-A in FIG. 6A, and FIG. 6C is a cross sectional view illustrating the snap-fit-type two-step gear 10, taken by a line in FIG. 6B.

Note that, in FIGS. 6A-6C, two snap fit portions 40 are provided on the snap-fit-type two-step gear 10. However, the snap fit portions 40 are also referred to in a singular form collectively as the snap fit portion 40, for convenience. The snap-fit-type two-step gear 10 having the inner web 14 and the outer web 15 and the ribs 16 and 17 has higher strength in the radial direction and the circumferential direction of the snap-fit-type two-step gear 10 than the snap-fit-type two-step gear 10 having no webs and no ribs. In a case in which the snap fit portion 40 is formed within the range of at least one of the inner web 14, the outer web 15, and the ribs 16 and 17, as the snap-fit-type two-step gear 10 is moved on the fixed shaft 20 to fit the snap fit portion 40 into the groove 22 of the fixed shaft 20, the snap-fit-type two-step gear 10 is not easily deformed, and therefore excessive force is applied in assembly of the gears to the fixed shafts.

In order to address this inconvenience, FIGS. 6A to 6C illustrate examples of the preferable positions of the snap fit portions 40 on the snap-fit-type two-step gear 10. To be more specific, as illustrated in FIGS. 6A and 6C, the snap fit portions 40 are provided at positions within an angle range avoiding the positions of the ribs 16 and 17 expanding outwardly from the axial center of the snap-fit-type two-step gear 10 in a radial direction of the snap-fit-type two-step gear 10. Further, as illustrated in FIG. 6B, the snap fit portions 40 are provided at positions in the thrust direction avoiding the positions of the inner web 14 and the outer web 15. Due to these structures in FIGS. 6A to 6C, assembly of gears on shafts is performed without any excessive force.

Note that, in FIG. 6B, the ribs 16 and 17 are provided between the boss 11 and the small diameter rim 12 of the snap-fit-type two-step gear 10, on both sides in the thrust direction across the inner web 14, and in the same angle range. However, a configuration of the snap-fit-type two-step gear 10 is not limited to this configuration. Further, in FIGS. 6A to 6C, the rib 16 between the small diameter rim 12 and the large diameter rim 13 of the snap-fit-type two-step gear 10 is provided in the same angle range as the rib 16 between the boss 11 and the small diameter rim 12. However, a configuration of the snap-fit-type two-step gear 10 is not limited to this configuration.

Figure 7:
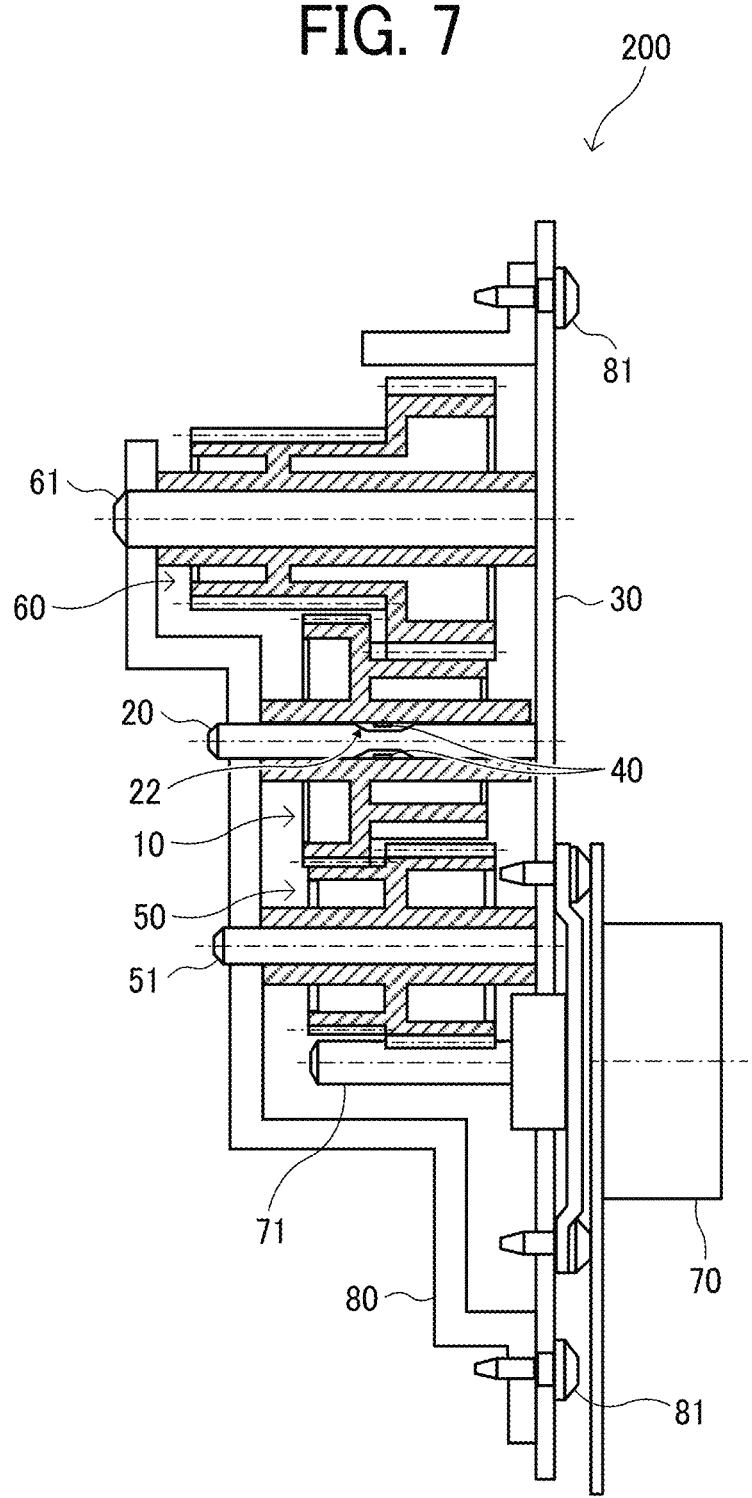
FIG. 7 is a diagram for explaining a preferred example of positional regulation in a thrust direction in the drive device.

FIG. 7 is a diagram for explaining a preferred example of positional regulations of the snap-fit-type two-step gear 10, the drive source side two-step gear 50, and the output side two-step gear 60 in the thrust direction in the drive device 200.

In the drive device 200 illustrated in FIG. 7, a housing 80 that functions as a holder is attached (secured) to the bracket 30 to cover the snap-fit-type two-step gear 10, the drive source side two-step gear 50, and the output side two-step gear 60. For this attachment of the housing 80 to the bracket 30, the housing 80 has fixed shaft insertion holes through which respective tip ends of the fixed shaft 20, the fixed shaft 51, and the fixed shaft 61 are inserted. After the snap-fit-type two-step gear 10 is attached to the fixed shaft 20 at the last stage of assembly illustrated in FIG. 4, the housing 80 is brought close to the bracket 30 in a direction parallel to the axial direction of the fixed shafts, so that the tip ends of the fixed shafts (i.e., the fixed shaft 20, the fixed shaft 51, and the fixed shaft 61) are inserted into the corresponding fixed shaft insertion holes of the housing 80. While the tip ends of the fixed shafts being inserted in the corresponding fixed shaft insertion holes of the housing 80, the housing 80 is secured to the bracket 30 with screws 81.

The snap-fit-type two-step gear 10 is attached to the fixed shaft 20 before the housing 80 is attached to the bracket 30 is in a state, also referred to as State 1, in which the snap fit portion 40 is fitted in the groove 22 of the fixed shaft 20 by slidably moving to the groove 22 while contacting the straight portion of the fixed shaft 20 on the tip end side of the fixed shaft 20 from the groove 22 or in a state, also referred to as State 2, in which the snap fit portion 40 is in contact with the straight portion of the fixed shaft 20 before reaching the groove 22. State 1 is more preferable to State 2 from a view point of preventing the other gears (such as the drive source side two-step gear 50, and the output side two-step gear 60) from coming off from the corresponding fixed shafts (such as the fixed shaft 51 and the fixed shaft 61) before the housing 80 is attached to the bracket 30. However, when it is less likely that the other gears come off from the corresponding fixed shafts, State 2 is acceptable. In State 2, when attaching the housing 80 to the bracket 30, the tip end face of the boss 11 of the snap-fit-type two-step gear 10 is pressed against the inner wall face of the housing 80 to cause the snap-fit-type two-step gear 10 to slide on the fixed shaft 20 toward the bracket 30.

When the housing 80 is attached to the bracket 30, the inner wall face of the housing 80 in the thrust direction relative to the groove 22 of the fixed shaft 20 is located where the snap fit portion 40 is fit in the groove 22 while the surface of the tip end 18 of the boss 11 of the snap-fit-type two-step gear 10 is in contact with the inner wall face of the housing 80. With this configuration, as illustrated in FIG. 4, when attaching the housing 80 to the bracket 30, even when the housing 80 presses the snap-fit-type two-step gear 10 toward the bracket 30, the snap fit portion 40 is not pushed to a position where the snap-fit-type two-step gear 10 contacts the straight portion of the fixed shaft 20 closer to the bracket 30 than the groove 22 of the fixed shaft 20. Further, when movements of the drive source side two-step gear 50 and the output side two-step gear 60 in the thrust direction are restricted on the housing 80 side, the drive source side two-step gear 50 and the output side two-step gear 60 do not contact the snap-fit-type two-step gear 10.

Figure 8:
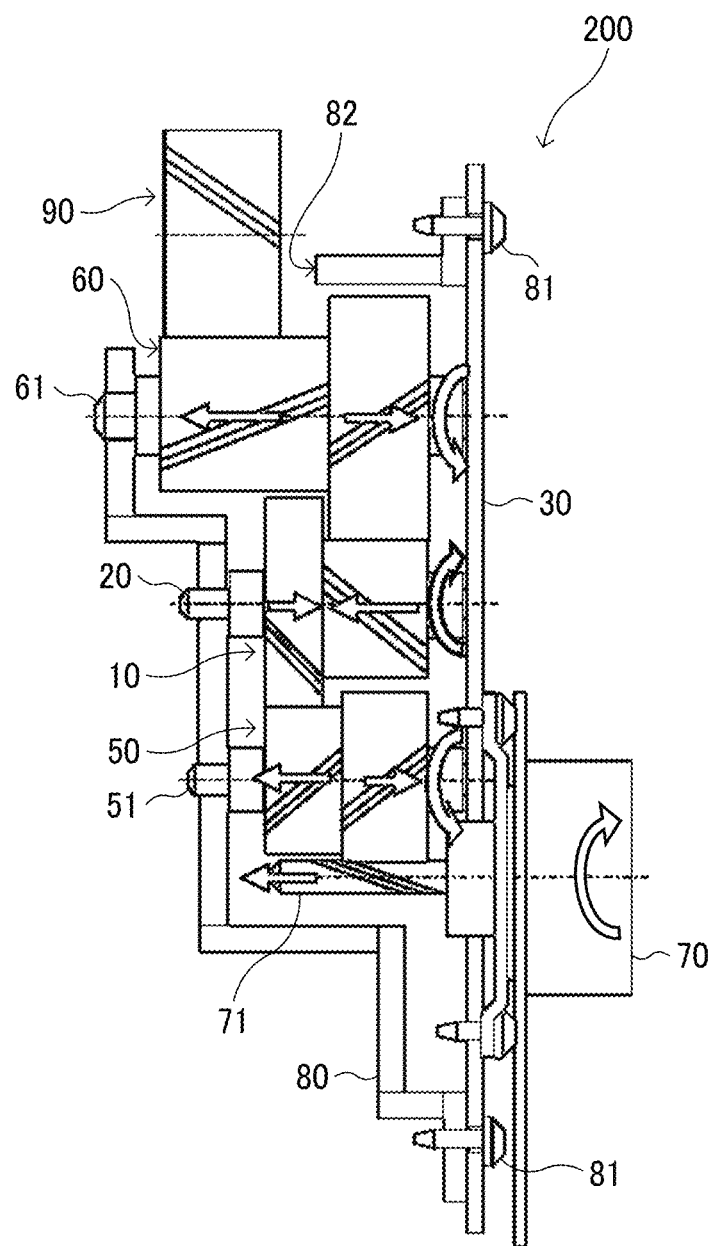
FIG. 8 is a diagram for explaining an example of the drive device using a helical gear as each gear in the drive device.

FIG. 8 is a diagram for explaining an example of the drive device 200 using a helical gear as the snap-fit-type two-step gear 10 in the drive device 200.

In the configuration of the drive device 200 illustrated in FIG. 8, helical gears are employed to the gears of the motor gear 71 and the gears of the small diameter rims and the large diameter rims of the snap-fit-type two-step gear 10, the drive source side two-step gear 50, and the output side two-step gear 60. Arrows in FIG. 8 indicate respective thrust forces transmitted to the helical gears from the respective gears meshed with the helical gears and respective rotational directions of the helical gears. The motor 70 drives stably when force is received to press the bracket 30. Therefore, it is preferable to apply the thrust force to the motor gear 71 as illustrated in FIG. 8. To be more specific, for example, the motor 70 rotates in a direction to direct the thrust force transmitted from the helical gear that is meshed with the motor gear 71 toward the bracket 30.

The gear train of the small diameter rims and the large diameter rims of the drive source side two-step gear 50 and the output side two-step gear 60 have the same twist directions. With this configuration, the thrust force in a single gear is cancelled, and therefore excessive vibration is not transmitted to the bracket 30 and the housing 80.

The whole gear train of the drive source side two-step gear 50 and the output side two-step gear 60 is on the left side in FIG. 8. If the left side of FIG. 8 indicates the inside of the device that includes the gear train, noise generated by vibration transmitted to the housing 80 is prevented from leaking to the outside of the device. For example, in a case in which FIG. 1 illustrates a schematic configuration of the image forming apparatus 100, viewed from the left side plate of the image forming apparatus 100, when providing the drive device 200 on the right side plate of the image forming apparatus 100, the bracket 30 is fixed to the right side plate of the image forming apparatus 100 while maintaining the position of the bracket 30 at which the housing 80 of FIG. 9 is disposed in the inside (at the center in the horizontal direction or the left and right directions) of the image forming apparatus 100. Note that a gear 90 that is meshed with the gear teeth of the small diameter rim of the output side two-step gear 60 is a drive target side gear. A gear exposure window 82 is provided to the housing 80 for the gear meshing of the gear 90 and the small diameter rim of the output side two-step gear 60.

Figure 9A:
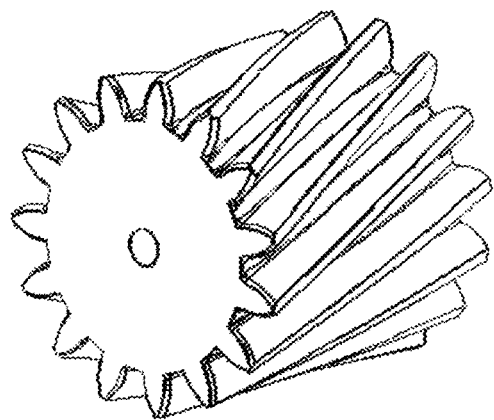
FIGS. 9A and 9B are diagrams for explaining a preferable gear tooth shape.
Figure 9B:
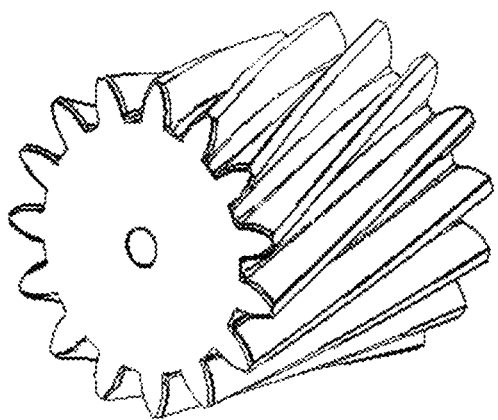

FIGS. 9A and 9B are diagrams for explaining preferable gear tooth shapes. Specifically, FIG. 9A is a diagram of a gear having a round shape at the tip end in the tooth width direction of each tooth of the gear. FIG. 9B is a diagram of a gear having a diagonally cut shape at the tip end in the tooth width direction of each tooth of the gear.

When attaching to the fixed shaft 20, the snap-fit-type two-step gear 10 is properly meshed with the drive source side two-step gear 50 and the output side two-step gear 60. If the phases of the gears (that is, the snap-fit-type two-step gear 10 and each of the drive source side two-step gear 50 and the output side two-step gear 60) are deviated, the teeth of the gears contact with each other, resulting in a difficult assembly and damage in the gears. In order to avoid this inconvenience, the tip end of each tooth of the gear is rounded or diagonally cut. With this structure, a surface contact is avoided in assembly of the gears, and therefore the gears are attached smoothly. Though a gear having a snap fit portion is attached with a certain force, the gear having the teeth of the round shape or the diagonally cut shape is assembled easily.

Figure 10:
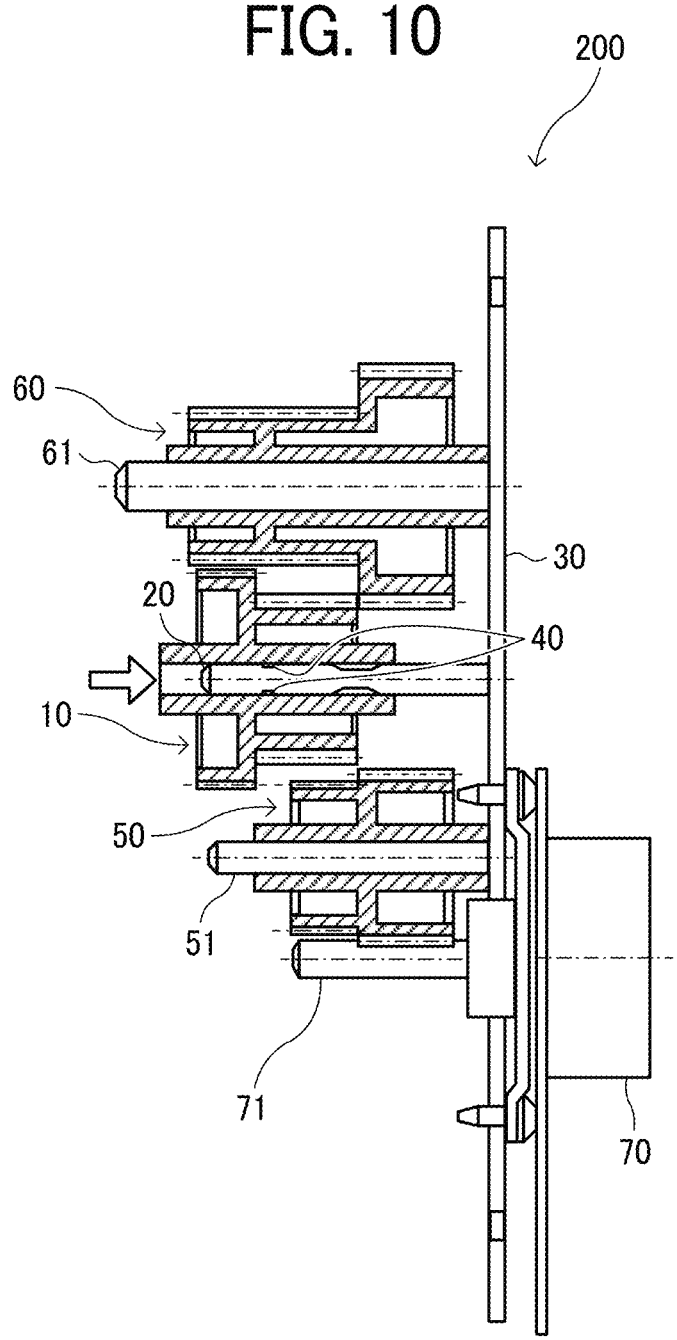
FIG. 10 is a diagram for explaining an example of a difficult assembly of a snap-fit type two-stage gear.
Figure 11:
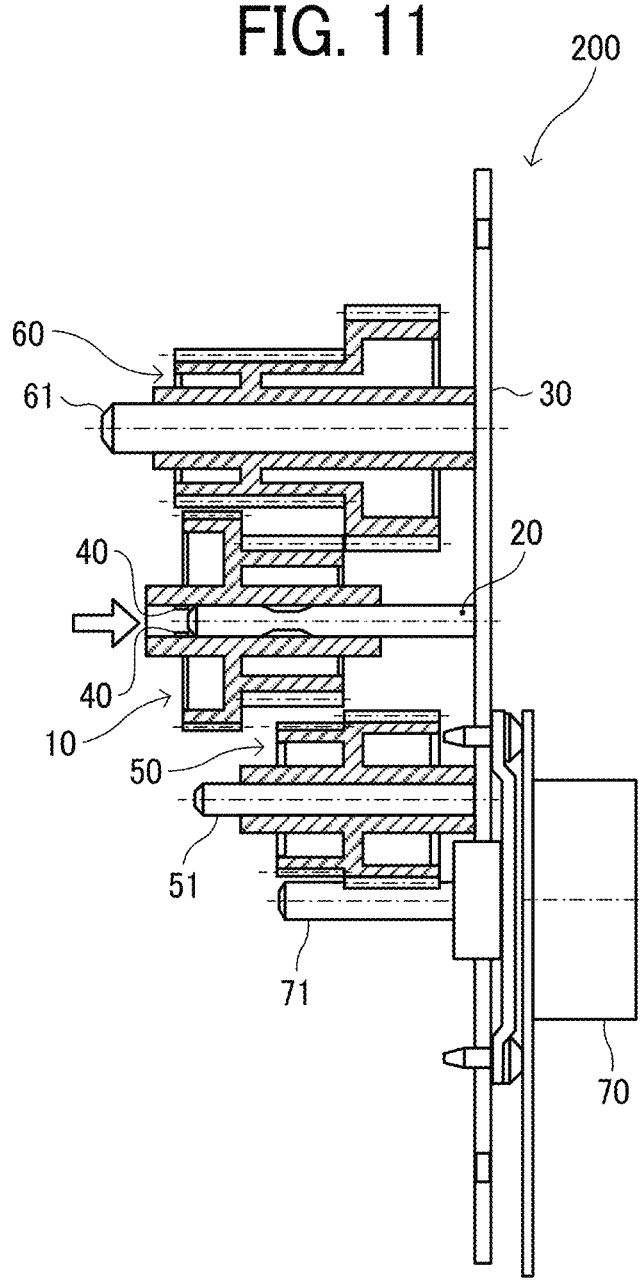
FIG. 11 is a diagram for explaining an example of the drive device with the enhanced assemblability.
Figure 12:
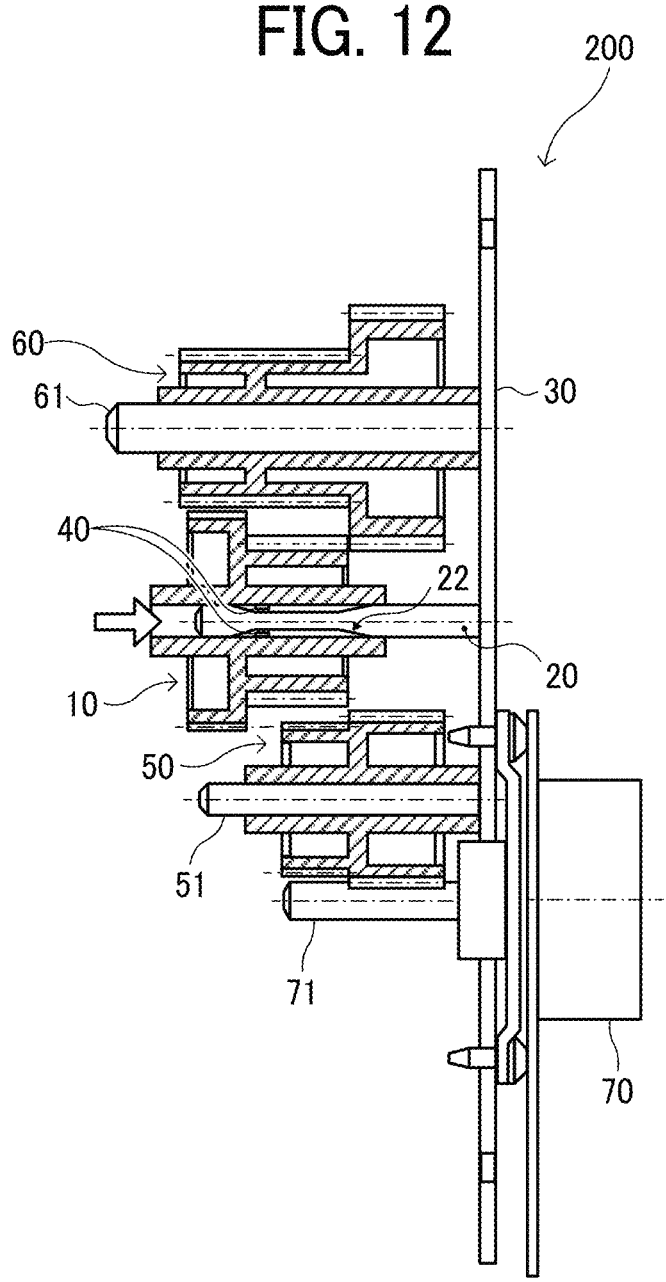
FIG. 12 is a diagram for explaining another example of the drive device with the enhanced assemblability.

FIGS. 10, 11, and 12 are diagrams for explaining the positional relation of the groove 22 of the fixed shaft 20 and the snap fit portion 40 of the snap-fit-type two-step gear 10.

FIG. 10 is a diagram for explaining an example of a difficult assembly of the snap-fit-type two-step gear 10.

After the drive source side two-step gear 50 and the output side two-step gear 60 are attached to the fixed shaft 51 and the fixed shaft 61, respectively, the snap-fit-type two-step gear 10 is then attached to the fixed shaft 20. At this time, in a case in which the phase of the snap-fit-type two-step gear 10 and each of the drive source side two-step gear 50 and the output side two-step gear 60 is deviated, the end portions of the gears in mesh contact to each other. For example, the output side two-step gear 60 in FIG. 10.) If the deviation in phase of the gears occurs, as the gear (for example, the snap-fit-type two-step gear 10) is pushed while rotating (or screwing), the gear is attached to the shaft (for example, the fixed shaft 20). However, if the snap fit portion 40 is located at the straight portion of the fixed shaft 20 at this timing, the gear is lightly press-fitted. As a result, it is difficult to attach the gear by rotating (or screwing).

FIG. 11 is a diagram for explaining an example of the drive device 200 with the enhanced assemblability.

In order to avoid the state illustrated in FIG. 10, it is effective that the timing at which the snap fit portion 40 is caught at the straight portion of the fixed shaft 20 to be lightly press-fitted and the timing at which the end portions of the tooth surfaces of the gears in mesh contact to each other are shifted (deviated) from each other. In FIG. 11, at the timing at which the end portion of the tooth surface of the snap-fit-type two-step gear 10 contacts the end portion of the tooth surface of the output side two-step gear 60, the snap fit portion 40 of the snap-fit-type two-step gear 10 has not reached the tip end portion of the fixed shaft 20. At this time, since the snap-fit-type two-step gear 10 is completely free from the fixed shaft 20, the phase of the snap-fit-type two-step gear 10 and the output side two-step gear 60 is adjusted easily.

FIG. 12 is a diagram for explaining another example of the drive device with the enhanced assemblability.

In FIG. 12, at the timing in which the end portion of the tooth surface of the snap-fit-type two-step gear 10 contacts the end portion of the tooth surface of the output side two-step gear 60, the snap fit portion 40 of the snap-fit-type two-step gear 10 has already been fitted in the groove 22 of the fixed shaft 20. Even at this timing, the snap-fit-type two-step gear 10 is completely free from the fixed shaft 20, the phase of the snap-fit-type two-step gear 10 and the output side two-step gear 60 is adjusted easily.

Figure 13:
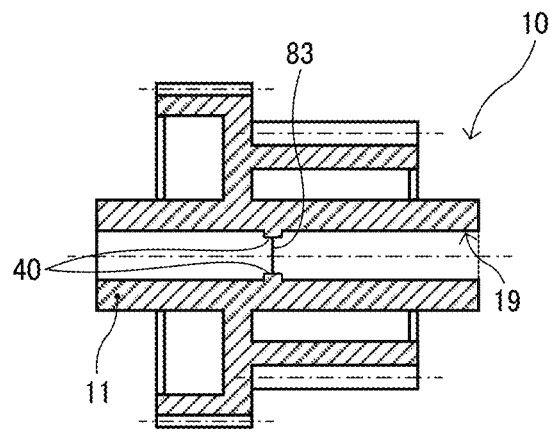
FIG. 13 is a diagram for explaining another preferred example of the snap-fit type two-stage gear.

FIG. 13 is a diagram for explaining another preferred example of the position of the snap fit portion 40 in the snap-fit-type two-step gear 10.

As illustrated in the cross sectional view of FIG. 13, in a case in which resin molding is performed with two resin molds separated to two sides (the left and right sides in FIG. 13) in the thrust direction of the snap-fit-type two-step gear 10, a step 83 (to be more specific, a PL (parting line) step 83) is formed on the mold parting line of the resin molds. When the step 83 comes into contact with the inner circumference of the fixed shaft insertion hole 19, noise is generated.

Therefore, the step 83 is positioned in the groove 22 of the fixed shaft 20. For example, the step 83 in the thrust direction is set at the position of the snap fit portion 40. This configuration of the snap-fit-type two-step gear 10 prevents contact of the step 83 to the straight portion of the fixed shaft 20, and therefore prevents occurrence of noise.

Figure 14:
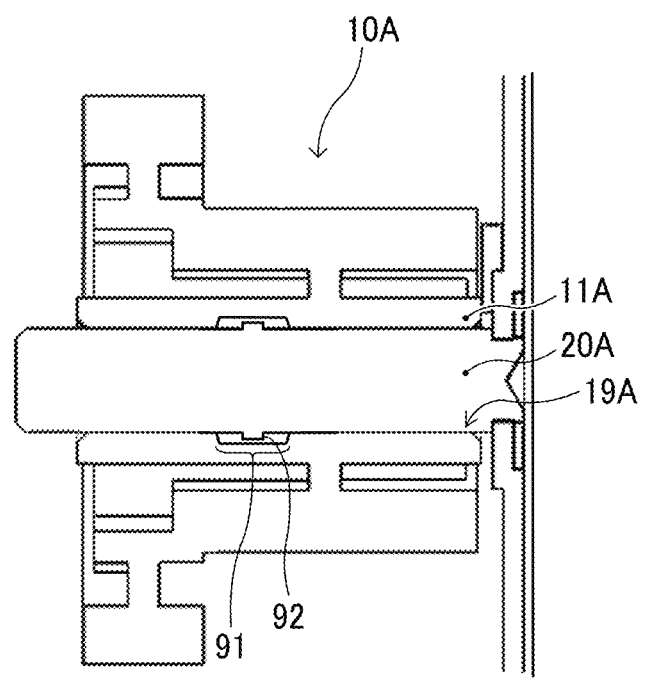
FIG. 14 is a diagram for explaining an example of a snap-fit type two-stage gear of Variation.

FIG. 14 is a diagram for explaining an example of the snap-fit-type two-step gear 10 of Variation.

In Variation, a groove 91 is formed over the whole inner circumference of a boss 11A of a snap-fit-type two-step gear 10A, except both ends in the thrust direction of the snap-fit-type two-step gear 10A. Similarly, a projection 92 is provided on the outer circumference of a fixed shaft 20A, so as to be positioned in the groove 91 of the snap-fit-type two-step gear 10A. The projection 92 and the groove 91 form a snap-fit unit. The snap-fit unit is elastically deformable, To be more specific, the wall of the boss 11A of the snap-fit-type two-step gear 10A with the boss 11A made of resin may be deformable or the projection 92 of the fixed shaft 20A may be deformable. When the projection 92 of the fixed shaft 20A is made deformable, the whole of the fixed shaft 20A may be made of resin or the projection 92 alone may be deformable.

Similar to the configuration illustrated in FIG. 2B, shaft receiving areas are provided on both sides of the two-step gear 10A across the groove 91 in the axial direction of the two-step gear 10A, where straight portions of the fixed shaft 20A contact straight portions of the inner circumference of a fixed shaft insertion hole 19A of the two-step gear 10A.

As described above, a two-step gear is employed as a drive transmitter, but the drive transmitter of this disclosure may be a multistep gear such as a three-step gear, a single-step gear, or a rotary body for drive transmission other than a gear. Further, a rotary body of a drive transmitter is also applicable to this disclosure. For example, a sheet conveyance roller provided in an image forming apparatus may be applied as a rotary body to be attached to a fixed shaft. Further, a rotary body provided to a device other than an image forming apparatus may also be applicable.

This configuration according to the above-descried examples are not limited thereto. This disclosure can achieve the following aspects effectively.

Aspect 1.

In Aspect 1, a drive device (for example, the drive device 200) includes a bracket (for example, the bracket 30), a fixed shaft (for example, the fixed shaft 20), and a drive transmitter (for example, the snap-fit-type two-step gear 10). The fixed shaft has a groove (for example, the groove 22) and is fixed to the bracket. The drive transmitter includes an opening (for example, the fixed shaft insertion hole 19) through which the fixed shaft is inserted and a projection (for example, the snap fit portion 40) disposed on an inner circumference of the opening and configured to fit into the groove of the fixed shaft. The drive transmitter is configured to hold the fixed shaft over a range including both ends of the opening in a thrust direction of the drive transmitter with the drive transmitter being attached to the fixed shaft.

According to this configuration, as described in the above-described embodiment, the drive transmitter is fixed to the fixed shaft to the end portion of the drive transmitter reliably.

Accordingly, the drive transmitter is prevented from tilting.

Aspect 2.

The drive device (for example, the drive device 200) of Aspect 1 further includes another fixed shaft (for example, the fixed shaft 51, the fixed shaft 61) and another drive transmitter (for example, the drive source side two-step gear 50, the output side two-step gear 60) rotatably mounted on said another fixed shaft. Said another drive transmitter has a bracket side portion (for example, the large diameter rim of the drive source side two-step gear 50, the large diameter rim of the output side two-step gear 60) closer to the bracket, than at least a part of the drive transmitter (for example, the snap-fit-type two-step gear 10). The at least a part of the drive transmitter is configured to face the bracket side portion on an opposite side opposite to a bracket facing side on which said another drive transmitter faces the bracket.

According to this configuration, as described in the above-described embodiment, fixing the drive transmitter by a single snap-fit prevents said another drive transmitter from coming off from said another fixed shaft. Accordingly, by attaching the drive transmitter of Aspect 1 to the fixed shaft (for example, the fixed shaft 20), said another drive transmitter is prevented from coming off from said another fixed shaft easily.

Aspect 3.

In the drive device (for example, the drive device 200) of Aspect 1 or Aspect 2, the drive transmitter (for example, the snap-fit-type two-step gear 10) has a web (for example, the inner web 14, the outer web 15) and a rib (for example, the rib 16, the rib 17) outwardly from the projection in a radial direction of the drive transmitter. The projection (for example, the snap fit portion 40) of the drive transmitter is disposed avoiding at least one of the web and the rib disposed outwardly in the thrust direction (axial direction) of the drive transmitter.

According to this configuration, as described in the above-described embodiment, providing the projection at a position where no web or no rib is disposed prevents the drive transmitter from deforming easily. Accordingly, the drive transmitter is easily attached to the fixed shaft (for example, the fixed shaft 20).

Aspect 4.

The drive device (for example, the drive device 200) of any one of Aspects 1 to 3 further including a holder (for example, the housing 80) secured to the bracket (for example, the bracket 30) to hold the drive transmitter (for example, the snap-fit-type two-step gear 10) between the holder and the bracket. The holder and the bracket are configured to restrict movement of the drive transmitter in the thrust direction of the drive transmitter. The projection (for example, the snap fit portion 40) is spaced apart from an inner surface of the groove (for example, the groove 22) with the movement of the drive transmitter in the thrust direction being restricted.

According to this configuration, as described in the above-described embodiment, movement of the drive transmitter in the thrust direction is restricted at both ends of the drive transmitter in the thrust direction. Accordingly, any one of a spur gear, a belt, and a helical gear may be used and the thrust force may be applied in either direction.

Aspect 5.

The drive device (for example, the drive device 200) of any one of Aspects 1 to 4 further including a motor (for example, the motor 70) including a motor gear (for example, the motor gear 71) and attached to the bracket (for example, the bracket 30). The drive transmitter (for example, the snap-fit-type two-step gear 10) is a helical gear and is configured to mesh with the motor gear of the motor. The motor is configured to rotate in a direction to direct a thrust force transmitted from the helical gear toward the bracket.

According to this configuration, as described in the above-described embodiment, by pressing the motor against the bracket side by the thrust force, the motor rotates stably.

Aspect 6.

In the drive device (for example, the drive device 200) of any one of Aspects 1 to 5, the drive transmitter (for example, the snap-fit-type two-step gear 10) is a multistep helical gear including multiple gear portions that have identical twist directions to each other.

According to this configuration, as described in the above-described embodiment, since the multistep helical gear has the multiple steps having the twist directions identical to each other, the thrust force is cancelled. Accordingly, vibration to be transmitted to the bracket (for example, the bracket 30) is reduced.

Aspect 7.

In the drive device (for example, the drive device 200) of any one of Aspects 1 to 6, the drive transmitter (for example, the snap-fit-type two-step gear 10) is configured to receive thrust force applied toward an inside of a device in which the drive transmitter is provided.

According to this configuration, as described in the above-described embodiment, by placing a vibration source in the inside of the device, leakage of vibration generated in each device to the outside of the device is reduced.

Aspect 8.

In the drive device (for example, the drive device 200) of any one of Aspects 1 to 7, the drive transmitter (for example, the snap-fit-type two-step gear 10) is a gear. As the drive transmitter is attached to the fixed shaft (for example the fixed shaft 20) with components other than the chive transmitter being in contact with the bracket (for example, the bracket 30) in the thrust direction of the drive transmitter, gear teeth tips of the drive transmitter are spaced apart from each other in a state in which the projection (for example, the snap fit portion 40) of the drive transmitter is in contact with a straight portion of the fixed shaft (for example, the fixed shaft 20).

According to this configuration, as described in the above-described embodiment, if the projection to be fitted to the fixed shaft by snap fit is provided on the straight portion of the fixed shaft, the gear is lightly press-fitted to the fixed shaft, which makes it difficult to rotate the gear. Accordingly, this configuration effectively avoids this inconvenience in which the gear is not meshed with another gear easily.

Aspect 9.

In the drive device (for example, the drive device 200) of any one of Aspects 1 to 8, the drive transmitter (for example, the snap-fit-type two-step gear 10) is a gear having a round shape of a diagonally cut shape at a tip end of each tooth of the gear in a tooth width direction of the gear.

According to this configuration, as described in the above-described embodiment, by cutting the tooth tip into a rounded tooth tip or a diagonally cut tooth tip, gears are easily meshed to each other.

Aspect 10.

In the drive device (for example, the drive device 200) of any one of Aspects 1 to 6, the drive transmitter (for example, the snap-fit-type two-step gear 10) includes a step (for example, the step 83) over an entire inner diameter, and the projection (for example, the snap fit portion 40) in disposed at a same position as the step in the thrust direction of the drive transmitter.

According to his configuration, as described in the above-described embodiment, vibration generated due to the step is prevented.

The effects described in the embodiments of this disclosure are listed as most preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of the invention, and are included in the scope of the invention recited in the claims and its equivalent.

Any one of the above-described operations may be performed in various other ways, for example, in an order different from the one described above.

What is claimed is:

1. A drive device comprising:
   a bracket;
   a fixed shaft fixed to the bracket and having a groove; and
   a drive transmitter rotatably mounted on the fixed shaft,
   the drive transmitter including:
      an opening through which the fixed shaft is inserted; and
      a first projection disposed on an inner circumference of the opening and configured to fit into the groove of the fixed shaft,
   the drive transmitter being configured to hold the fixed shaft over a range including both ends of the opening in a thrust direction of the drive transmitter with the drive transmitter being attached to the fixed shaft,
   wherein the drive transmitter has at least a web and a plurality of ribs, each of the plurality of ribs extends outwardly from the inner circumference in a respective radial direction of the drive transmitter,
   wherein the web extends outwardly from the inner circumference between the plurality of ribs,
   wherein the first projection of the drive transmitter extends inwardly from the inner circumference such that the first projection does not overlap any of the respective radial directions of the plurality of ribs,
   wherein the drive transmitter further includes a second projection disposed on an inner circumference of the opening and configured to fit into the groove of the fixed shaft,
   wherein the second projection extends inwardly from the inner circumference such that the second projection does not overlap any of the respective radial directions of the plurality of ribs, and
   wherein the first projection and the second projection of the drive transmitter extend inwardly from the inner circumference such that the first projection and the second projection do not overlap the web in an axial direction of the fixed shaft.

2. The drive device according to claim 1, further comprising:
   another fixed shaft; and
   another drive transmitter rotatably mounted on said another fixed shaft,
   wherein said another drive transmitter has a bracket side portion that is located closer to the bracket than at least a part of the drive transmitter, and
   wherein the at least a part of the drive transmitter is configured to face the bracket side portion on an opposite side opposite to a bracket facing side on which said another drive transmitter faces the bracket.

3. The drive device according to claim 1, further comprising a holder secured to the bracket to hold the drive transmitter between the holder and the bracket and restrict movement of the drive transmitter in the thrust direction of the drive transmitter, and
wherein the first projection is spaced apart from an inner surface of the groove with the movement of the drive transmitter in the thrust direction being restricted.

4. The drive device according to claim 1, further comprising a motor including a motor gear and attached to the bracket,
wherein the drive transmitter is a helical gear and is configured to mesh with the motor gear of the motor, and
wherein the motor is configured to rotate in a direction to direct a thrust force transmitted from the helical gear toward the bracket.

5. The drive device according to claim 1,
wherein the drive transmitter is a multistep helical gear including multiple gear portions that have same twist directions.

6. The drive device according to claim 1,
wherein the drive transmitter is configured to receive thrust force applied toward an inside of a device in which the drive transmitter is provided.

7. The drive device according to claim 1,
wherein the drive transmitter is a gear, and
wherein, as the drive transmitter is attached to the fixed shaft with components other than the drive transmitter being in contact with the bracket in the thrust direction of the drive transmitter, gear teeth tips of the drive transmitter are spaced apart from each other in a state in which the first projection of the drive transmitter is in contact with a straight portion of the fixed shaft.

8. The drive device according to claim 1,
wherein the drive transmitter is a gear having a round shape or a diagonally cut shape at a tip end of each tooth of the gear in a tooth width direction of the gear.

9. The drive device according to claim 1,
wherein the drive transmitter includes a step over an entire inner diameter, and
wherein the first projection is disposed at a same position as the step in the thrust direction of the drive transmitter.

10. An image forming apparatus comprising the drive device according to claim 1.

11. The drive device according to claim 1, wherein the first projection is configured to be fitted into the groove with a snap-fit-style connection.

12. The drive device according to claim 1,
wherein the first projection and the second projection of the drive transmitter are configured such that the drive transmitter is rotatable about the fixed shaft relative to the fixed shaft and that the drive transmitter is restricted to move relative to the fixed shaft in the axial direction of the fixed shaft.

13. The drive device according to claim 1,
wherein the first projection and the second projection of the drive transmitter include a snap fit portion configured to fit the drive transmitter into the fixed shaft.

14. The drive device according to claim 1,
wherein the web includes a first web at a first height in the axial direction and a second web at a second height in the axial direction, and
wherein the first height and the second height are different heights.

* * * * *